(12) United States Patent
Masuda

(10) Patent No.: US 8,136,994 B2
(45) Date of Patent: Mar. 20, 2012

(54) SENSOR-EQUIPPED ROLLING BEARING APPARATUS

(75) Inventor: Yoshinori Masuda, Toyota (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 666 days.

(21) Appl. No.: 12/285,631

(22) Filed: Oct. 9, 2008

(65) Prior Publication Data

US 2009/0096441 A1 Apr. 16, 2009

(30) Foreign Application Priority Data

Oct. 10, 2007 (JP) ................. P2007-264653
Oct. 10, 2007 (JP) ................. P2007-264654

(51) Int. Cl.
*F16C 41/04* (2006.01)

(52) U.S. Cl. ........................................ 384/448

(58) Field of Classification Search .......... 384/448, 384/479, 480, 488; 301/105.1; 324/160, 324/173, 179, 207.23, 207.25, 156, 157, 324/600–727
See application file for complete search history.

(56) References Cited

U.S. PATENT DOCUMENTS

| | | | |
|---|---|---|---|
| 5,451,869 A | 9/1995 | Alff | |
| 5,678,933 A | 10/1997 | Ouchi et al. | |
| 5,997,182 A | 12/1999 | Brown | |
| 6,232,772 B1 | 5/2001 | Liatard et al. | |
| 6,267,509 B1 | 7/2001 | Morimura | |
| 7,281,424 B2 | 10/2007 | Sakamoto | |
| 7,547,145 B2 * | 6/2009 | Yamamoto | 384/448 |
| 2005/0226545 A1 | 10/2005 | Ohtsuki et al. | |
| 2007/0278851 A1 | 12/2007 | Nakamura et al. | |

FOREIGN PATENT DOCUMENTS

| | | |
|---|---|---|
| EP | 0 913 693 A2 | 5/1999 |
| EP | 1 679 518 A1 | 7/2006 |
| JP | 60-150335 | 10/1985 |
| JP | 9-49853 | 2/1997 |
| JP | 10-48229 | 2/1998 |
| JP | 2000-19190 | 1/2000 |
| JP | 2000-221202 | 8/2000 |
| JP | 2000-221203 | 8/2000 |
| JP | 2000-221204 | 8/2000 |
| JP | 2000-221205 | 8/2000 |
| JP | 2000-225930 | 8/2000 |

(Continued)

OTHER PUBLICATIONS

European Search Report dated Feb. 2, 2009.

(Continued)

*Primary Examiner* — Thomas R Hannon
*Assistant Examiner* — Phillip A Johnson
(74) *Attorney, Agent, or Firm* — McGinn IP Law Group, PLLC

(57) ABSTRACT

An annular member is mounted on an outer ring, and a sensor is fixed to the annular member. The annular member includes a fixing portion, and a cover portion. The sensor is fixed to the fixing portion by a bolt and a nut. The fixing portion is fixed to the cover portion by bolts. The cover portion is separate from the fixing portion, and therefore does not have an opening extending in a circumferential direction, and covers a magnet rotor fitted on an inner ring in the circumferential direction.

5 Claims, 9 Drawing Sheets

FOREIGN PATENT DOCUMENTS

| | | |
|---|---|---|
| JP | 2001-147252 | 5/2001 |
| JP | 2003-120703 | 4/2003 |
| JP | 2004116713 A * | 4/2004 |
| JP | 2005-9525 | 1/2005 |
| JP | 2005-220940 | 8/2005 |
| JP | 2006-284402 | 10/2006 |
| JP | 2007-183247 (A) | 7/2007 |

OTHER PUBLICATIONS

Japanese Office Action dated Nov. 22, 2011 with an English translation thereof.

* cited by examiner

SENSOR-EQUIPPED ROLLING BEARING APPARATUS

BACKGROUND OF THE INVENTION

1. Field of the Invention

This invention relates to a sensor-equipped rolling bearing apparatus.

2. Related Art

In the measurement of a rotational motion in various apparatuses, there are cases where a measurement mechanism is provided on a bearing apparatus. For example, when there is provided an ABS (anti-lock braking system) for a vehicle axle drive wheel, an ABS sensor for detecting a rotational speed is often fixed to a bearing apparatus. In this case, the ABS sensor is fixed to a cover member fitted on an outer periphery of a stationary ring of the bearing, and the ABS sensor detects the rotational speed on the basis of a change of a magnetic flux density caused by the rotation of a magnet rotor (magnetic member) fitted on a rotating ring of the bearing.

In the type of structure in which an encoder made of a permanent magnet is fixed to a rotating ring of a bearing for rotatably supporting a drive wheel of a vehicle, foreign matters and others picked up during the travel of the vehicle deposit on a surface of the encoder to thereby adversely affect the detection ability for the rotational speed unless the an inner peripheral portion of a knuckle (which supports and fixes a bearing apparatus) and an axle, thereby isolating an encoder from an external space so that foreign matters will not deposit on the encoder.

In the technique of JP-A-2001-147252, although the encoder can be isolated from the exterior by the seal ring, a sliding resistance develops since the seal ring is disposed in sliding contact with the rotating axle and the fixed portion. This offers a resistance to the driving of the vehicle, and therefore is an obstacle to the achievement of a low fuel consumption. This is a great drawback in view of the fact that there is an increasing demand for improving the performance of vehicles.

Therefore, it is necessary to provide a bearing apparatus of the type in which the conventional technique is improved without degrading the bearing performance so that the magnetic member will not be exposed to the exterior. In one typical ABS mounting method heretofore extensively used, a cover member is fitted to a stationary ring of a rolling bearing, and for fixing an ABS sensor to the cover member, a pressing portion for pressing the ABS sensor by its elastic deformation is formed at the cover member, and the ABS sensor is fixed to the cover member through this pressing portion.

In such a case, it is a common practice to form the cover member and the pressing portion (formed thereon) into an unitary construction to provide a single member. As a result, an opening is inevitably formed in the cover member for covering a magnet rotor, and the magnet rotor is exposed to the exterior. In this case, the formation of the cover member and the pressing portion into the single member causes the exposure of the magnetic member.

SUMMARY OF THE INVENTION

With the above problems in view, it is an object of this invention to provide a sensor-equipped rolling bearing apparatus in which in a structure of fixing a sensor to the bearing apparatus, a portion for the fixing of the sensor thereto and a magnetic member a portion for covering the magnetic member are improved in construction so as not to be exposed to the exterior without lowering a bearing performance.

Another object of this invention is to provide a sensor-equipped rolling bearing apparatus in which in a structure of fixing a sensor to the bearing apparatus, a magnetic member will not be exposed to the exterior without lowering a bearing performance.

The above object has been achieved by a sensor-equipped rolling bearing apparatus of the present invention comprising a magnetic member mounted such that a magnetic field can alternately change in a circumferential direction of a rotating ring, and a sensor fixed to a stationary ring so as to detect the magnetic field of the magnetic member to thereby measure a rotational speed of the rotating ring; wherein the bearing apparatus includes an annular member through which the sensor is fixed to the stationary ring; and the annular member includes a fixing portion to which the sensor is fixed, and a cover portion fitted on the stationary ring; and the sensor is fixed to the fixing portion; and the fixing portion and the cover portion are separately formed and connected together; and the cover portion covers the magnetic member over an entire periphery thereof such that the magnetic member is not exposed to the exterior in an axial direction.

In the sensor-equipped rolling bearing apparatus of this construction, the fixing portion (to which the sensor is fixed) and the cover portion which are separately formed are connected together. The sensor is fixed to the fixing portion, and the cover portion covers the magnetic member over the entire periphery thereof such that the magnetic member is not exposed to the exterior in the axial direction. Thus, the fixing of the sensor to the bearing apparatus can be achieved, and also the exposure of the magnetic member to the exterior can be prevented. The sensor is fixed to the fixing portion firmly with the simple method. Therefore, the sensor is prevented from being displaced out of its proper position and posture because of a low fixing strength, which would otherwise increase an error in the measured value obtained by the sensor. Furthermore, the fixing portion and the cover portion are separately formed, and therefore the magnetic member is prevented from being exposed to the exterior in contrast with the conventional structure in which the fixing portion and the cover portion are formed integrally with each other with the result that the opening through which the magnet member is exposed to the exterior is inevitably formed in the cover portion. Thus, the exposure of the magnetic member to the exterior is prevented, and therefore foreign matters are prevented from depositing on the magnetic member, and therefore the reliability of detection by the sensor will not be lowered.

Preferably, the sensor has a projecting portion, and a through hole is formed through the projecting portion, and the sensor is fixed to the annular member such that the projecting portion projects in the axial direction and that a direction of extending of the through hole through the projection portion is a radial direction.

In this construction, the sensor is fixed to the annular member such that the projecting portion projects in the axial direction and that the direction of extending of the through hole through the projection portion is the radial direction. Therefore, the mechanism for fixing the sensor to the annular member does not project radially, and is space-saving, and therefore is suitably mounted on the bearing apparatus.

Preferably, a pair of rail grooves are formed respectively in end faces of the sensor spaced from each other in the circumferential direction, and extend generally in the radial direction, and a pair of rail portions are formed on the annular member, and are inserted respectively in the rail grooves, and hold the sensor therebetween in the circumferential direction.

In this construction, the rail portions spaced from each other in the circumferential direction are fitted respectively in the rail grooves, thereby positioning the sensor, and therefore the movement of the sensor in the axial direction is prevented. In addition, the movement of the sensor in the radial direction and the circumferential direction is prevented by fastening as described above, and therefore the sensor can be more stably held in the proper position and posture. Therefore, there can be provided the sensor-equipped rolling bearing apparatus in which the sensor is prevented from being displaced out of its proper position and posture, so that an error in the measured value obtained by the sensor is prevented from increasing, and the reliability of the measured value is high.

Preferably, the annular member includes a cylindrical portion and an extension portion extending radially from an axially-outer end of the cylindrical portion toward the rotating ring; and the extension portion includes an abutment surface abutting against an end face of the stationary ring in a state that the cylindrical portion of the annular member is fitted to the stationary ring, and a covering surface covering the magnetic member in the axial direction; and the covering surface is disposed axially outwardly of the abutment surface, and a clearance is formed between the covering surface and the magnetic member.

In this construction, by bringing the abutment surface into abutting engagement with the end face of the stationary ring, the positioning of the annular member can be effected. Therefore, in this sensor-equipped rolling bearing apparatus, the positioning of the annular member is more stable as compared with a conventional structure in which an abutment surface is not formed on an annular member. Therefore, the annular member will not be shaken, and will not be displaced out of its proper position and posture, and therefore the reliability of a measured value obtained by the sensor can be further enhanced. The outer and inner diameters of the extension portion of the annular member are determined such that the extension portion covers the magnetic member. Therefore, the intrusion of foreign matters from the exterior is suppressed, and therefore the deposition of such foreign matters on the magnetic member is suppressed. Therefore, the reliability of detection of the magnetic field of the magnetic member by the sensor is enhanced. Therefore, there can be provided the sensor-equipped rolling bearing apparatus in which thanks to the fixing strength and stability of the sensor, the reliability of the measured value obtained by the sensor is high.

Preferably, a drain hole for discharging water is formed in the extension portion such that a portion of the abutment surface corresponding to the drain hole is removed.

In this construction, muddy water and the like intruding into the bearing apparatus can be discharged to the exterior through the drain hole, and therefore the fouling of the sensor and the magnetic member by muddy water (dirt) is lowered, and therefore an error in the measured value of the sensor due to such dirt is suppressed. Therefore, there can be provided the sensor-equipped rolling bearing apparatus in which the reliability of the measured value obtained by the sensor is high.

Preferably, the extension portion includes a deflector portion, and the deflector portion extends axially outwardly from an inner periphery of the covering surface, and conforms in shape to an outer peripheral surface of the shaft, and covers the shaft in the radial direction with a clearance formed therebetween.

In this construction, the shaft is covered by the deflector portion in the radial direction with the clearance formed therebetween, and therefore a labyrinth structure is formed by the deflector portion, so that foreign matters are prevented from intruding into the bearing from the vicinity of the shaft. Therefore, the deposition of such foreign matters on the magnetic member is suppressed, so that the reliability of the measured value of the sensor is prevented from being lowered. And besides, the deflector portion is held out of contact with the shaft, and therefore a contact resistance as produced with the use of a seal will not develop, and therefore the intrusion of foreign matters into the bearing can be prevented without lowering the bearing performance. Therefore, there can be provided the sensor-equipped rolling bearing apparatus in which the reliability of the measured value obtained by the sensor is high.

Preferably, the shaft includes a shaft conical portion gradually increasing in outer diameter away from the bearing, and the deflector portion includes a deflector conical portion gradually increasing in inner diameter in corresponding relation to the shaft conical portion, and the degree of increase of the inner diameter of the deflector conical portion in the direction away from the bearing is not smaller than the degree of increase of the outer diameter of the shaft conical portion in the direction away from the bearing.

In this construction, the inner diameter of the deflector portion increases with the increase of the outer diameter of the shaft, and the degree of increase of the inner diameter of the defector portion is not smaller than the degree of increase of the outer diameter of the shaft, and therefore the labyrinth structure can be easily formed along the outer peripheral surface of the shaft. And besides, the degree of increase of the inner diameter of the deflector portion and the degree of increase of the outer diameter of the shaft are determined as described above, and therefore the deflector portion will not contact the shaft, and therefore will not offer a resistance to the rotation of this shaft, and in this condition the intrusion of foreign matters from the exterior can be suppressed. Therefore, there can be provided the sensor-equipped rolling bearing apparatus in which the reliability of the measured value obtained by the sensor is high.

Preferably, the sensor has a through hole, and the annular member has a hole. The sensor is fixed to the annular portion by a bolt or a rivet passing through the through hole and the hole.

In this construction, the sensor is fixed to the annular member by the bolt or the rivet, and therefore the sensor is firmly fixed to the annular member, and the sensor is prevented from being displaced from its proper position and posture, so that an error in the measure value is prevented. And besides, the fixing is effected using the bolt or the rivet, and therefore any additional portion for the fixing of the sensor thereto does not need to be formed on the annular member. In the conventional sensor-equipped rolling bearing apparatus, an annular member and a sensor-fixing portion are formed into a unitary construction, and therefore an opening is formed in the annular member, and a magnetic member is exposed to the exterior through this opening. In the above construction of the invention, however, such a sensor-fixing portion does not need to be formed at the annular member, and the covering surface and the deflector portion can be easily formed into the respective shapes such that the magnetic member will not be exposed to the exterior. Therefore, there can be provided the sensor-equipped rolling bearing apparatus in which foreign matters are not allowed to deposit on the magnetic member, and the reliability of the measured value obtained by the sensor is high.

DETAILED DESCRIPTION OF THE PREFERRED EMBODIMENTS

Figure 1:
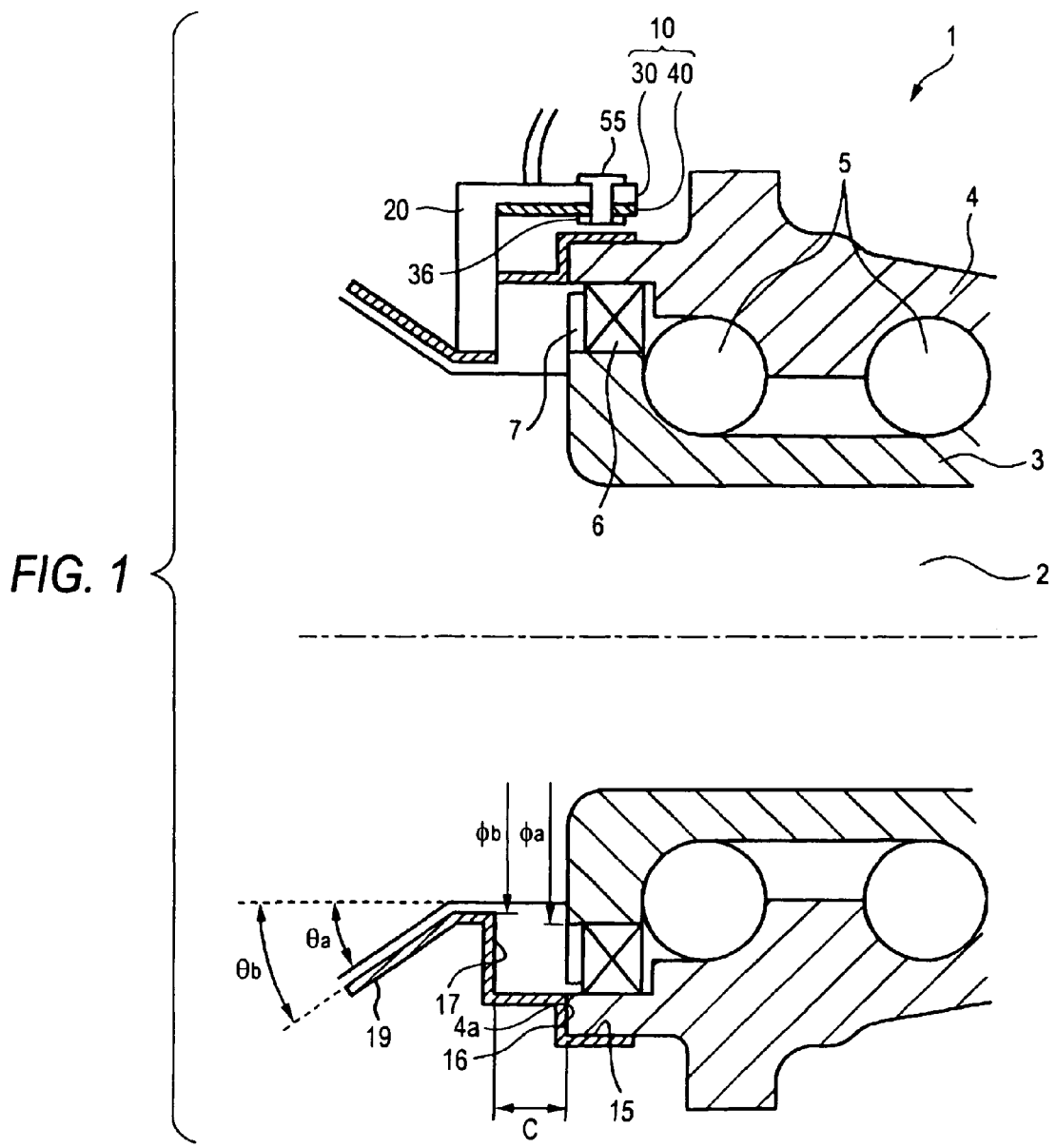
FIG. 1 is an axial cross-sectional view of one preferred embodiment of a sensor-equipped rolling bearing apparatus of the present invention.

A preferred embodiment of the present invention will now be described with reference to the drawings. FIG. 1 is an axial cross-sectional view of one preferred embodiment of a sensor-equipped rolling bearing apparatus (bearing apparatus) 1 of the invention. The bearing apparatus 1 comprises an inner ring 3 which rotatably supports a vehicle axle drive wheel and is fitted on an axle shaft (shaft) 2 for rotation therewith, an outer ring 4 fixed to a vehicle body, and rolling elements (rollers) 5 interposed between raceway surfaces formed respectively on the inner ring 3 and the outer ring 4. In FIG. 1, the left side is the wheel side, and the right side is the central side of the vehicle.

A seal 6 is provided at an axially-outer side (wheel side) of the bearing apparatus 1, and prevents foreign matters from intruding into the interior of the bearing from the exterior. A magnet rotor (magnetic member) 7 made of a permanent magnet is fitted on the outer periphery of the inner ring 3, and is disposed at the outer side of the seal 6. The magnet rotor 7 has N poles and S poles alternately arranged in a circumferential direction, and a magnetic flux density is changed in accordance with the rotation of the shaft 2 and the inner ring 3, and an ABS sensor (sensor) 20 described later detects this change, thereby measuring a rotational speed.

An annular member 10 of a ring-shape is fitted on the outer ring 4, and the sensor 20 is fixed to the bearing apparatus 1 through this annular member 10. The annular member 10 comprises a fixing portion 30, and a cover portion 40 as will hereafter more fully be described later. The sensor 20 is fixed to the annular member 10. A method of fixing the sensor 20 to the annular member 10 will be described below.

Figure 2:
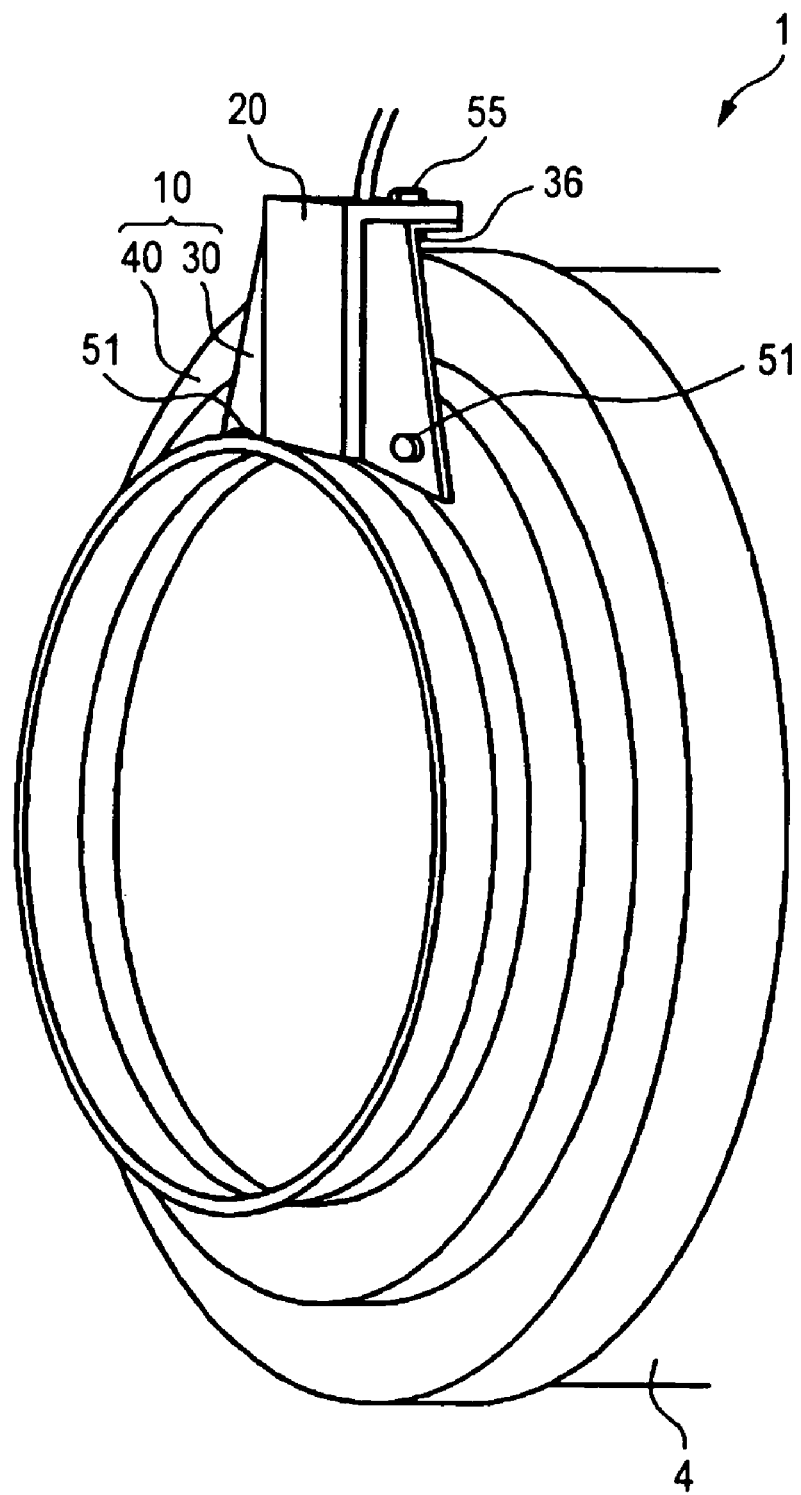
FIG. 2 is a perspective view of the sensor-equipped rolling bearing apparatus.
Figure 3:
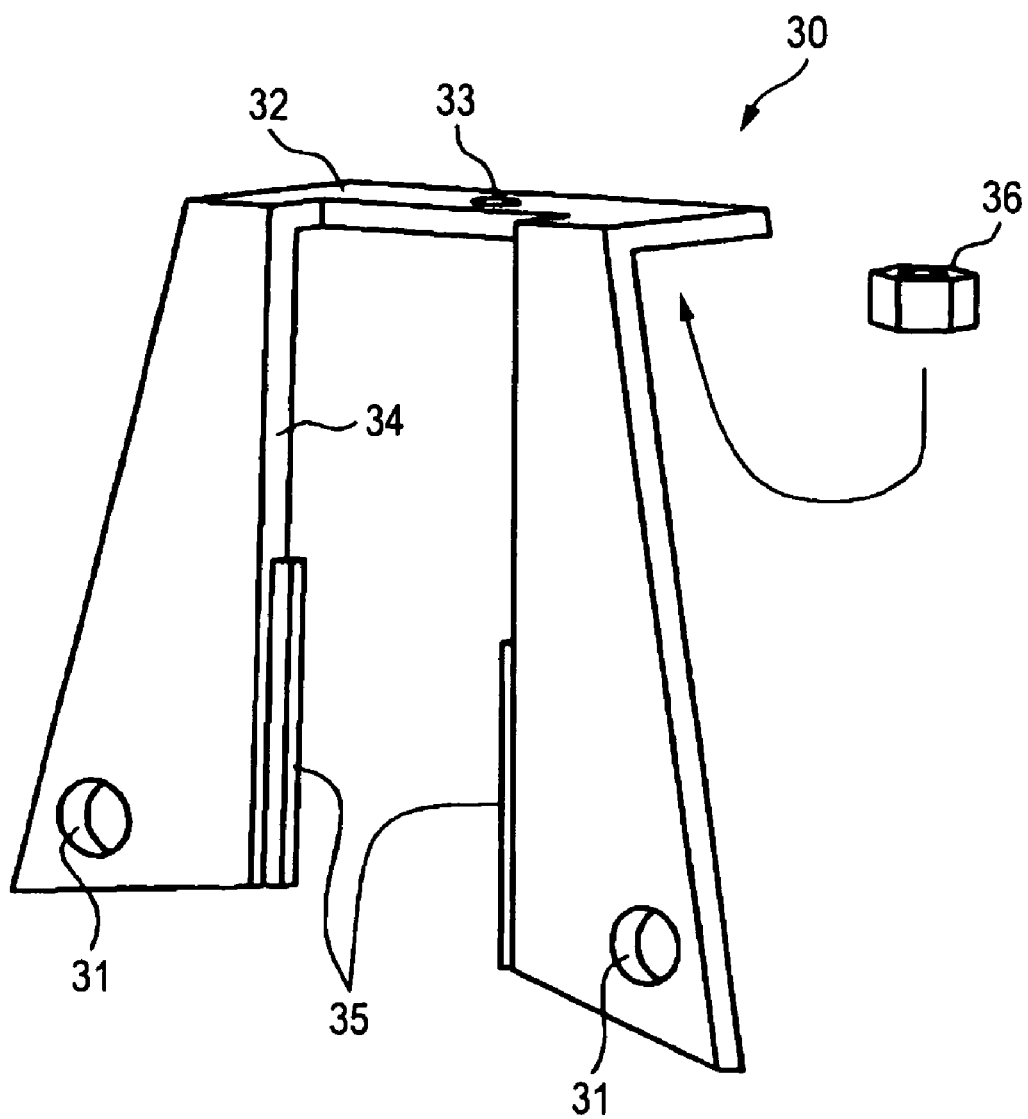
FIG. 3 is a perspective view of a fixing portion.
Figure 4:
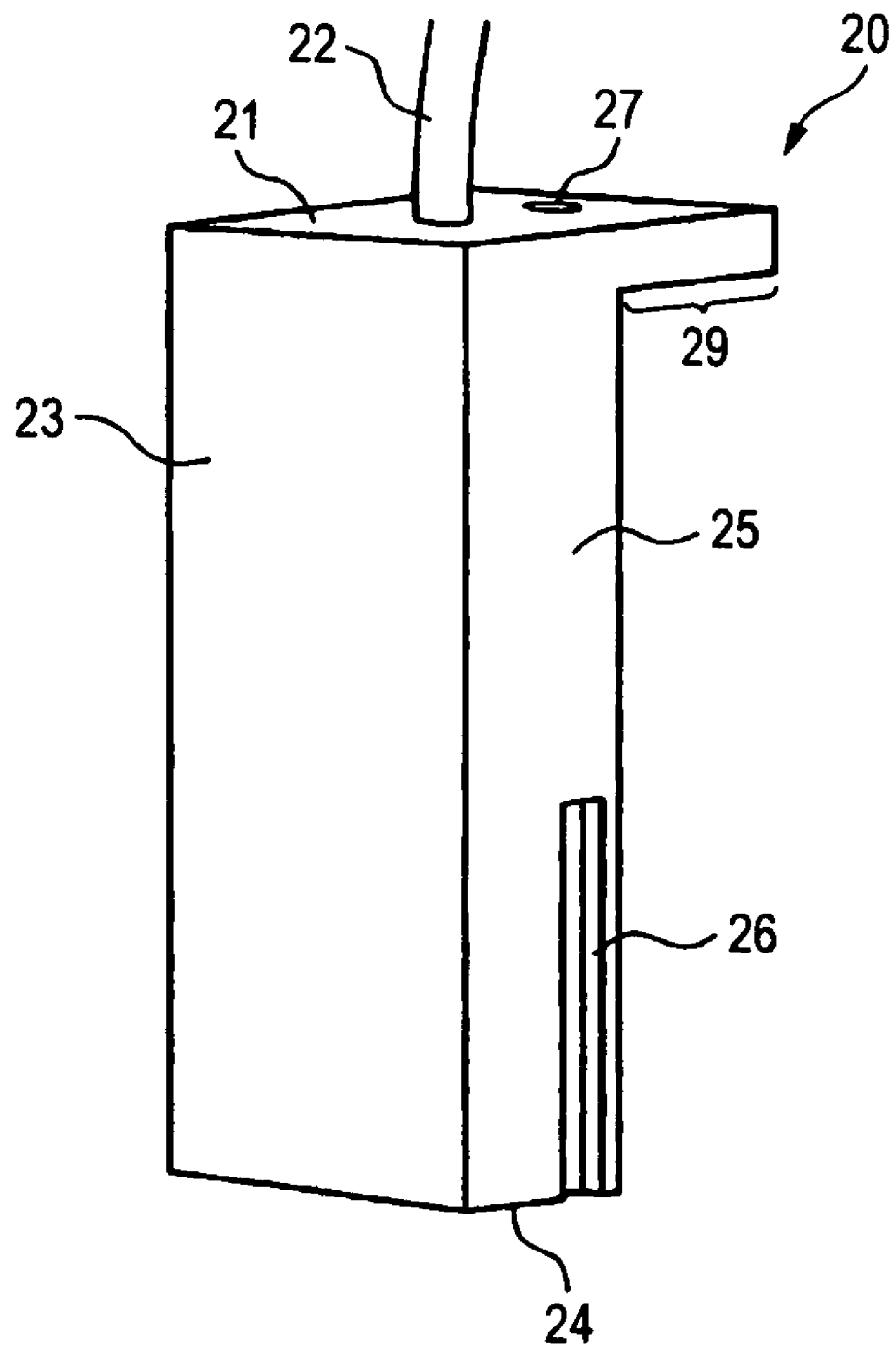
FIG. 4 is a perspective view of a sensor.
Figure 5:
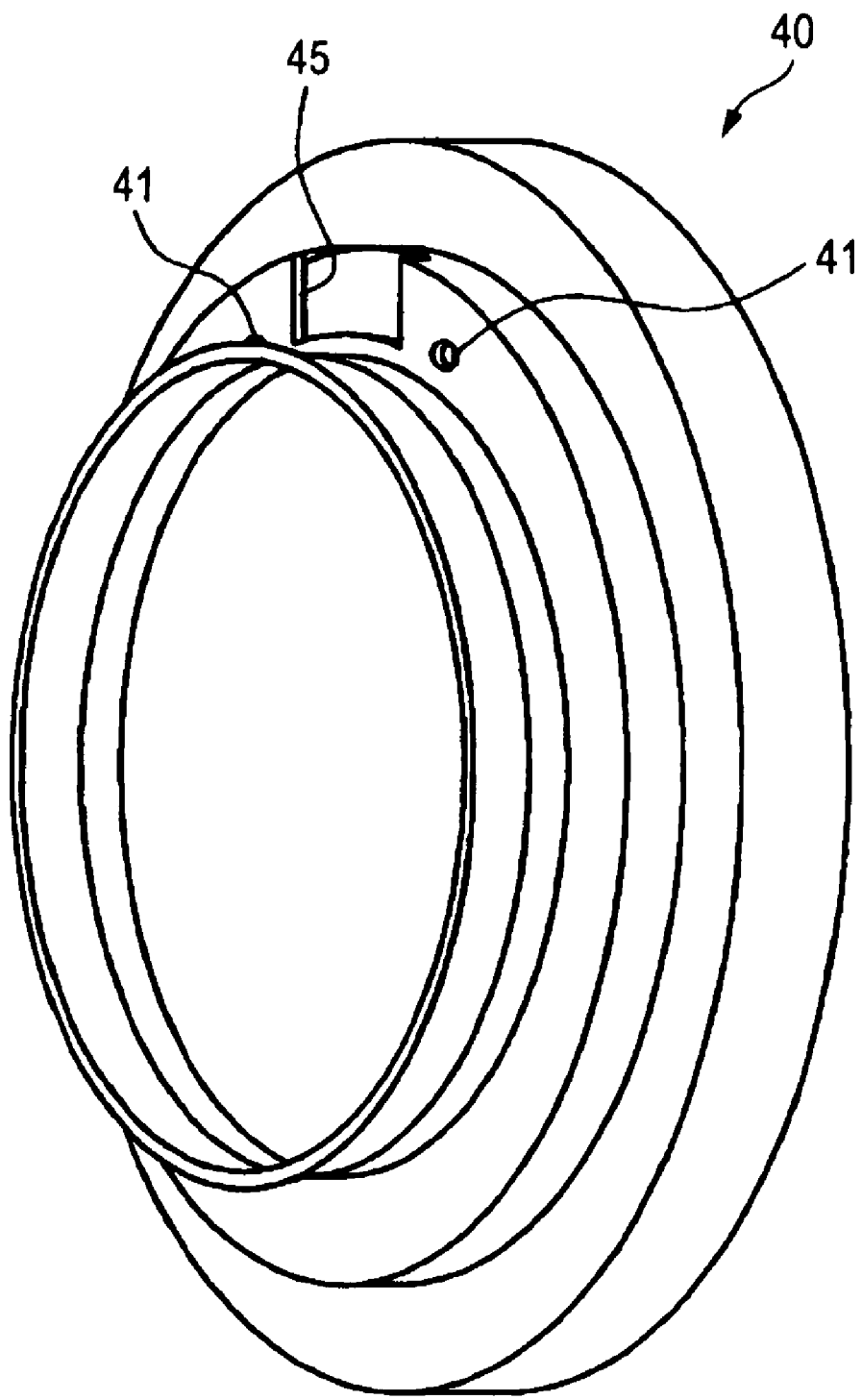
FIG. 5 is a perspective view of a cover portion.

FIG. 2 is a perspective view of the bearing apparatus 1. FIG. 3 is a view showing only the fixing portion 30, and FIG. 4 is a view showing only the sensor 20, and FIG. 5 is a view showing only the cover portion 40. A seat surface 32 for the placing of the sensor 20 thereon is formed at the fixing portion 30 shown in FIG. 3, and a hole 33 is formed in the seat surface 32. A nut 36 is welded to that surface (reverse surface) of the fixing portion 30 facing away from the seat surface 32, and is disposed at a radially-inwardly side of this hole 33.

Holes 31 for the purpose of fixing the fixing portion 30 to the cover portion 40 are also formed through the fixing portion 30. Further, a sensor mounting hole 34 for the mounting of the sensor 20 therein is formed in the fixing portion 30, and rail portions 35 are formed respectively on opposed side edges of the sensor mounting hole 34 which are to face opposite side faces of the sensor 20, respectively.

The sensor 20 shown in FIG. 4 broadly includes a body portion 21, and a signal wire 22. The body portion 21 is provided with a detection portion for detecting a magnetic flux density. A signal representative of a measured value is fed via the signal wire 22 to an ECU mounted on the vehicle.

The surface of the body portion 21 includes a distal end 24, a front face 23, and a side face 25. The body portion 21 further includes another side face (which is not shown in FIG. 4) facing away from the side face 25. A projecting portion 29 is formed at the body portion 21, and a through hole 27 is formed through this projecting portion 29. As shown in FIG. 2, the sensor 20 is fixed to the fixing portion 30 such that the distal end 24 is directed radially inwardly and that the projecting portion 27 is directed axially inwardly (that is, toward the inner side of the bearing).

As shown in FIG. 4, a rail groove 26 is formed in the side face 25 of the body portion 21, and extends from a generally central portion of the side face 25 to the distal end 24. Similarly, another rail groove identical in shape to the rail groove 26 is formed in the other side face of the body portion 21.

The cover portion 40 shown in FIG. 5 includes a fitting surface 15 for fitting on the outer periphery of the outer ring 4, and an abutment surface 16 extending radially inwardly from an end of the fitting surface 15 and adapted to abut against an end face 4a of the outer ring 4, as shown in FIG. 1. The fitting surface 15 is press-fitted on the outer peripheral surface of the outer ring 4, and the abutment surface 16 is brought into abutting engagement with the outer ring end face 4a, and by doing so, the positioning of the cover portion 40 is effected.

The cover portion 40 further includes a covering surface 17 for covering the magnet rotor 7, the covering surface 17 being disposed radially inwardly of the abutment surface 16. The covering surface 17 is spaced from the magnet rotor 7 in the axial direction, and covers this magnet rotor 7 in the circumferential direction. An inner diameter φb of the covering surface 17 is smaller than an inner diameter φa of the magnet rotor 7. With this construction, the covering surface 17 suppresses the exposure of the magnet rotor 7 to the exterior.

With this construction, the intrusion of foreign matters from the exterior is suppressed, and therefore the deposition of such foreign matters on the magnet rotor 7 is suppressed. And besides, a clearance C is formed between the magnet rotor 7 and the covering surface 17, and therefore if foreign matters should intrude into the bearing, the deposition of the foreign matters between the magnet rotor 7 and the covering surface 17 is suppressed. Thank to the configuration of the covering surface 17, the reliability of the magnet rotor 7 is maintained for a long period of time.

Further, a deflector portion 19 is formed on and extends axially outwardly (that is, away from the bearing) from the inner periphery of the covering surface 17. The deflector portion 19 has a shape conforming to the shape of the shaft 2, and the deflector portion 19 is gradually increasing in inner diameter toward its outer end in corresponding relation to an outer end portion of the shaft 2 which is gradually increasing in outer diameter toward the wheel. Thanks to the provision of the deflector portion 19, the intrusion of foreign matters into the interior of the bearing in the axial direction can be suppressed. Particularly, an angle θb between the inner peripheral surface of the defector portion 19 and the centerline (center axis) of the shaft 2 should be not smaller than an angle θa between the outer peripheral surface of the shaft 2 and the centerline of the shaft 2 as shown in FIG. 1. With this construction, the deflector portion 19 is prevented from contacting the shaft 2, and therefore will not offer any resistance to the rotation of the shaft 2.

Holes 41 are formed through the cover portion 40 as shown in FIG. 5. The holes 41 are used for the purpose of fixing the fixing portion 30 to the cover portion 40 as will hereafter more fully be described. Further, a sensor hole 45 is formed through the cover portion 40, and the sensor 20 is fixed to be disposed in the sensor hole 45, and therefore a measuring portion of the sensor 20 is directly opposed to the magnet rotor 7 so as to measure a magnetic field.

The rail portions 35 of the sensor 20 are fitted respectively in the rail grooves 26 of the fixing portion 30, and by doing so, the sensor 20 is integrally connected to the fixing portion 30. A bolt 55 is passed through the through hole 27 and the hole 33, and is threaded into the nut 36 welded to the reverse surface facing away from the seat surface 32, and thus the sensor 20 is fixed to the fixing portion 30 by the bolt 55 as shown in FIG. 2. Then, the fixing portion 30 is fixed to the cover portion 40 by bolts 51 each passing through the aligned holes 31 and 41 formed respectively through the fixing portion 30 and the cover portion 40.

In the above embodiment, internal threads may or may not be formed in each of the through holes 33 and 31. The nut 36 does not always need to be welded to the fixing portion 30. In the above embodiment, although the bolts are used for the through holes 33 and 31, there can be used any other suitable fastening method, and for example, rivets can be used instead of the bolts. When the rivets are used, the number of the component parts can be made smaller as compared with the case where the bolts are used.

Figure 6:
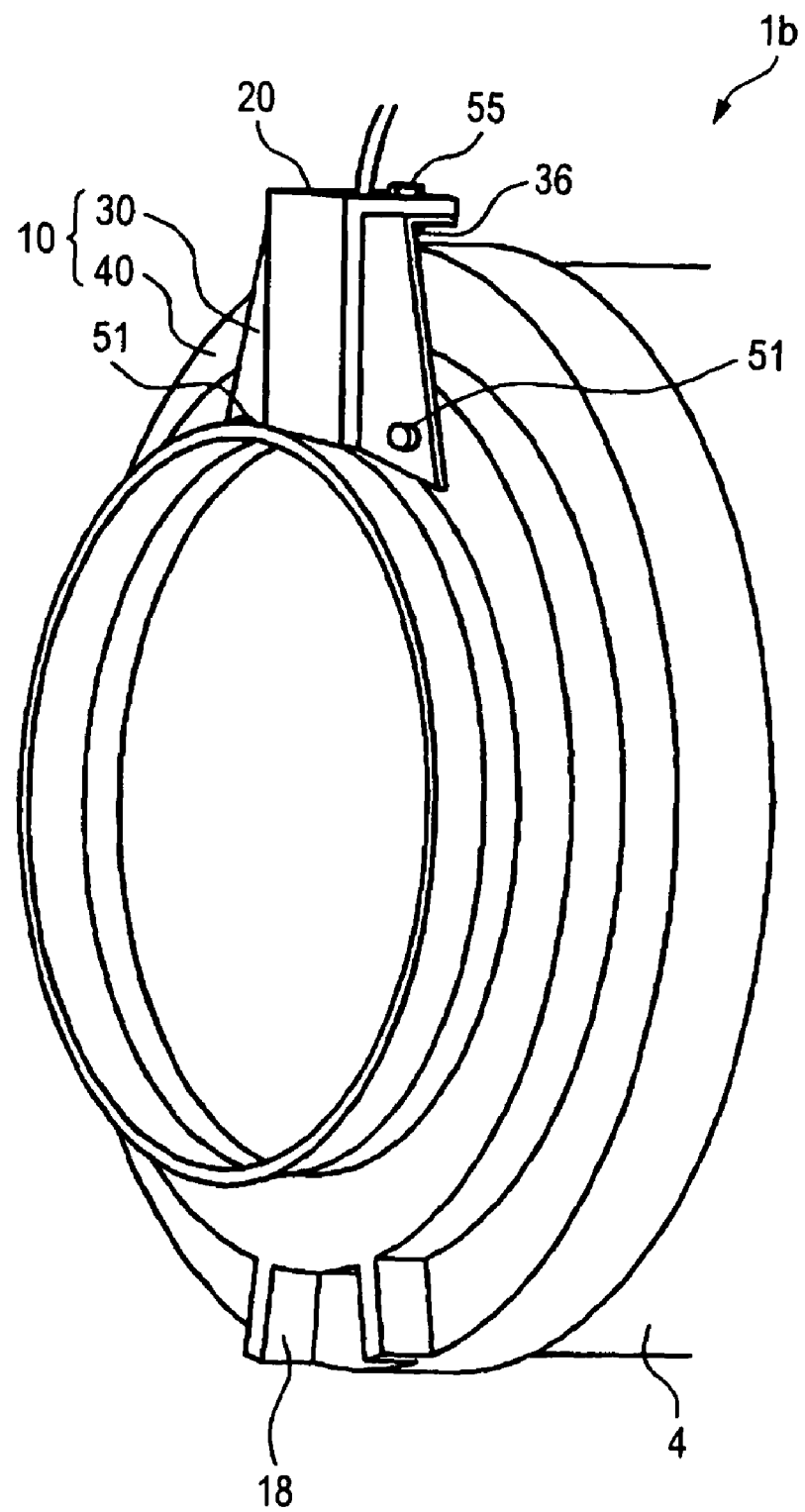
FIG. 6 is a first modified sensor-equipped rolling bearing apparatus.
Figure 7:
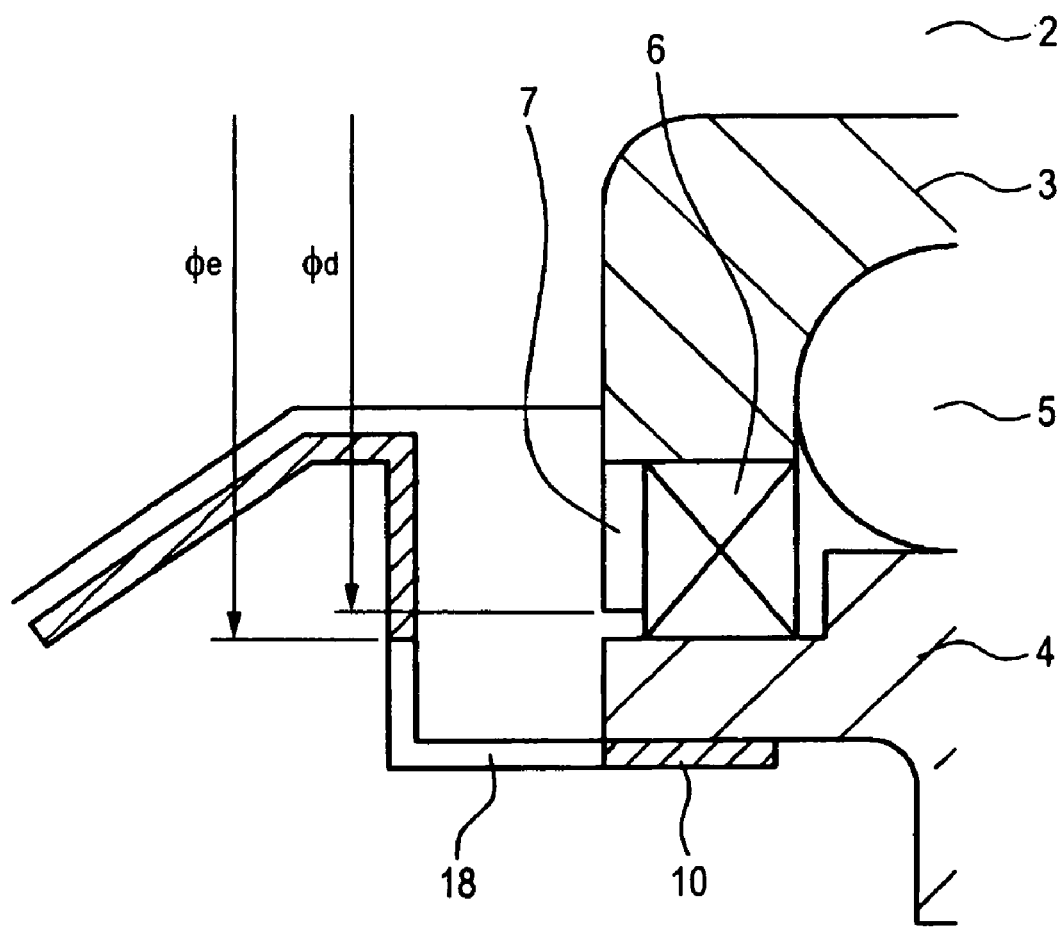
FIG. 7 is an axial cross-sectional view of the first modified sensor-equipped rolling bearing apparatus.

FIGS. 6 and 7 show a first modified example of the above embodiment, and this will be described below. In a sensor-equipped rolling bearing apparatus (bearing apparatus) 1b of this first modified example, a drain hole 18 for discharging water is formed in a lower portion (in the drawings) of a cover portion 40. When the bearing apparatus 1b is actually mounted in the vehicle, the lower portion of the cover portion 40 shown in FIGS. 6 and 7 is disposed at the lower side. Muddy water and the like intruding into the interior of the bearing apparatus 1b can be discharged to the exterior through this drain hole 18.

FIG. 7 is a an axial cross-sectional view of the first modified sensor-equipped rolling bearing apparatus 1b. A radially-inner end (indicated by $\phi e$ in FIG. 7) of the drain hole 18 is disposed radially outwardly of the outer periphery (indicated by $\phi d$) of the magnet rotor 7. With this construction, the exposure of the magnet rotor 7 to the exterior because of the provision of the drain hole 18 is suppressed. Therefore, the intrusion of foreign matters from the exterior through the drain hole 18 is suppressed, and the deposition of the foreign matters on the magnet rotor 7 is suppressed, and therefore the reliability of the magnet rotor 7 is maintained for a long period of time.

Figure 8:
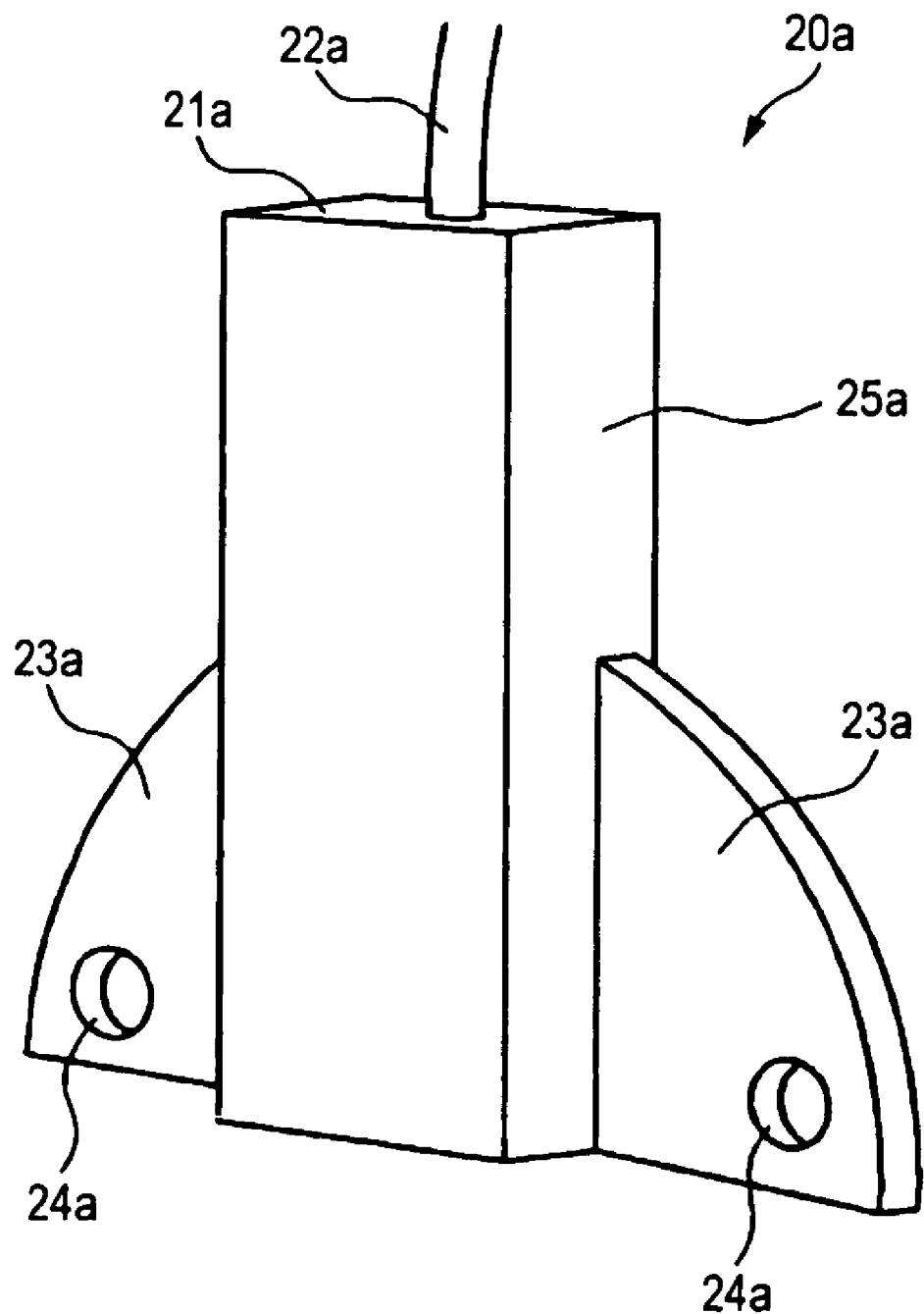
FIG. 8 is a perspective view of a modified sensor (second modified example).
Figure 9:
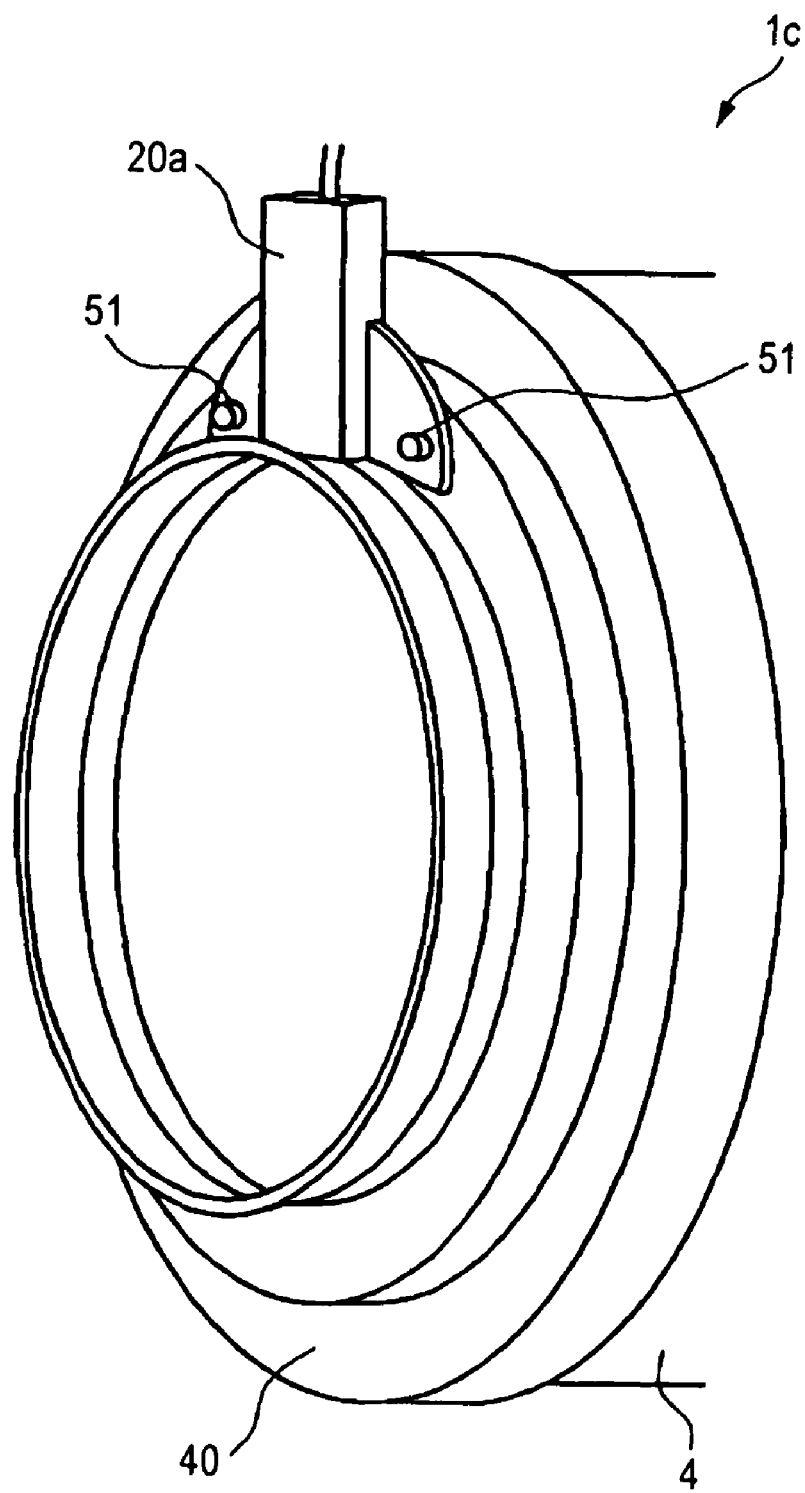
FIG. 9 is a perspective view of a second modified sensor-equipped rolling bearing apparatus.

FIGS. 8 and 9 show a second modified sensor-equipped rolling bearing apparatus 1c. In this second modified example, the fixing portion 30 is not used, and a sensor is directly fixed to the cover portion 40. The sensor 20a of the second modified example is shown in FIG. 8. The sensor 20a includes a body portion 21a, and a signal wire 22a. A pair of projecting portions 23a are formed respectively on opposite side faces 25a (only one of which is shown in FIG. 8) of the body portion 21a of the sensor 20a, and through holes 24a are formed respectively through the projecting portions 23a.

A measuring portion of the sensor 20a is disposed in the sensor hole 45 of the cover portion 40, with the through holes 24a aligned respectively with the holes 41, and in this condition the sensor 20a is fixed to the cover portion 40 by bolts 51 each passing through the aligned holes 24a and 41. Thus, the provision of the fixing portion 30 is omitted, and the sensor 20a is directly fixed to the cover portion 40, and by doing so, the low-cost design can be achieved. Instead of the bolts 51, rivets can be used to fix the sensor 20a to the cover portion 40.

What is claimed is:

1. A sensor-equipped rolling bearing apparatus comprising:
   a magnetic member mounted such that a magnetic field can alternately change in a circumferential direction of a rotating ring; and
   a sensor fixed to a stationary ring so as to detect the magnetic field of said magnetic member to thereby measure a rotational speed of said rotating ring,
   wherein said bearing apparatus includes an annular member through which, said sensor is fixed to said stationary ring,
   wherein said annular member includes a fixing portion to which said sensor is fixed, and a cover portion fitted on said stationary ring,
   wherein said fixing portion and said cover portion are separately formed and connected together,
   wherein said cover portion covers said magnetic member over an entire periphery thereof such that said magnetic member is not exposed to the exterior in an axial direction,
   wherein the annular member includes a cylindrical portion and an extension portion extending radially from an axially-outer end of the cylindrical portion toward the rotating ring,
   wherein the extension portion includes an abutment surface abutting against an end face of the stationary ring in a state that the cylindrical portion of the annular member is fitted to the stationary ring, and
   wherein a drain hole for discharging water is formed in the extension portion such that the abutment surface corresponding to the drain hole is removed.

2. A sensor-equipped rolling bearing apparatus according to claim 1, wherein said sensor includes a projecting portion,
   wherein a through hole is formed through said projecting portion, and
   wherein said sensor is fixed to said annular member such that said projecting portion projects in the axial direction and that a direction of extending of said through hole through said projection portion is a radial direction.

3. A sensor-equipped rolling bearing apparatus according to claim 1, wherein a pair of rail grooves are formed respectively in end faces of said sensor spaced from each other in the circumferential direction, and extend generally in the radial direction, and
   wherein a pair of rail portions are formed on said annular member, and are inserted respectively in said rail grooves, and hold said sensor therebetween in the circumferential direction.

4. A sensor-equipped rolling bearing apparatus according to claim 1,
   the extension portion includes a covering surface covering the magnetic member in the axial direction, and
   wherein the covering surface is disposed axially outwardly of the abutment surface, and a clearance is formed between the covering surface and the magnetic member.

5. A sensor-equipped rolling bearing apparatus according to claim 4, wherein the extension portion includes a deflector portion, and the deflector portion extends axially outwardly from an inner periphery of the covering surface, and conforms in shape to an outer peripheral surface of a shaft, and covers the shaft in the radial direction with a clearance formed therebetween.

* * * * *